United States Patent
Hall-Snyder et al.

(10) Patent No.: US 9,914,521 B1
(45) Date of Patent: Mar. 13, 2018

(54) BALLOON LAUNCHING APPARATUSES

(71) Applicant: X Development LLC, Mountain View, CA (US)

(72) Inventors: Michael Hall-Snyder, Palo Alto, CA (US); Sandeep Kumar Giri, Mountain View, CA (US); Shane Washburn, Oakland, CA (US); Joseph Charles Benedetto, Canton, GA (US); Keegan Gartner, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/601,113

(22) Filed: May 22, 2017

Related U.S. Application Data

(63) Continuation of application No. 14/838,498, filed on Aug. 28, 2015, now Pat. No. 9,745,040.

(60) Provisional application No. 62/182,112, filed on Jun. 19, 2015.

(51) Int. Cl.
| | |
|---|---|
| B64B 1/40 | (2006.01) |
| B64B 1/58 | (2006.01) |
| B64F 1/12 | (2006.01) |

(52) U.S. Cl.
CPC .................. B64B 1/40 (2013.01); B64B 1/58 (2013.01); B64F 1/12 (2013.01)

(58) Field of Classification Search
CPC ..................... A63H 27/10; A63H 27/14; A63H 2027/1033; B64B 1/00; B64B 1/005; B64B 1/40; B64B 1/42; B64B 1/54; B64B 1/58

See application file for complete search history.

(56) References Cited

U.S. PATENT DOCUMENTS

| | | |
|---|---|---|
| 2,635,834 A | 4/1953 | Huch |
| 2,708,082 A | 5/1955 | Huch |
| 2,954,187 A | 9/1960 | Winzen |
| 2,977,069 A | 3/1961 | Huch |
| 3,063,657 A | 11/1962 | Coester |
| 3,081,967 A | 3/1963 | Church |
| 3,093,351 A | 6/1963 | Ney et al. |
| 3,151,824 A | 10/1964 | Struble |
| 3,195,839 A | 7/1965 | Dietsche |
| 3,507,462 A | 4/1970 | Stefan |
| 3,524,609 A | 8/1970 | Sparkman et al. |
| 3,558,083 A | 1/1971 | Conley et al. |
| 3,814,353 A | 6/1974 | Nelson |
| 4,911,379 A | 3/1990 | Kopelman |

(Continued)

*Primary Examiner* — Benjamin P Lee
(74) *Attorney, Agent, or Firm* — Lerner, David, Littenberg, Krumholz & Mentlik, LLP

(57) ABSTRACT

Aspects of the disclosure relate to techniques for launching high-altitude balloons. In one aspect, a balloon launching system is provided. The balloon has a balloon envelope, a payload attached to the balloon envelope and a launching projection. The launching system includes a releasable restraint attached to the balloon between an apex and bottom of the balloon envelope. The releasable restraint is arranged to temporarily hold the balloon envelope. The launching system also includes a payload positioning assembly. The payload positioning assembly is configured to position the payload during launch of the balloon and includes a member configured to attach to the launching projection. When attached, the member is also configured to maintain the position of the payload relative to the balloon while the releasable restraint is temporarily holding the balloon envelope.

20 Claims, 15 Drawing Sheets

(56) References Cited

U.S. PATENT DOCUMENTS

| | | | |
|---|---|---|---|
| 6,234,425 | B1 | 5/2001 | Rand et al. |
| 8,061,648 | B2 | 11/2011 | Lachenmeier |
| 8,857,759 | B2 | 10/2014 | Yurchak |
| 8,910,905 | B2 | 12/2014 | DeVaul et al. |
| 2012/0181380 | A1 | 7/2012 | Van Staagen et al. |
| 2016/0202704 | A1 | 7/2016 | Hoheisel et al. |
| 2016/0280380 | A1 | 9/2016 | Fourie |
| 2016/0304216 | A1 | 10/2016 | Matthews et al. |

600

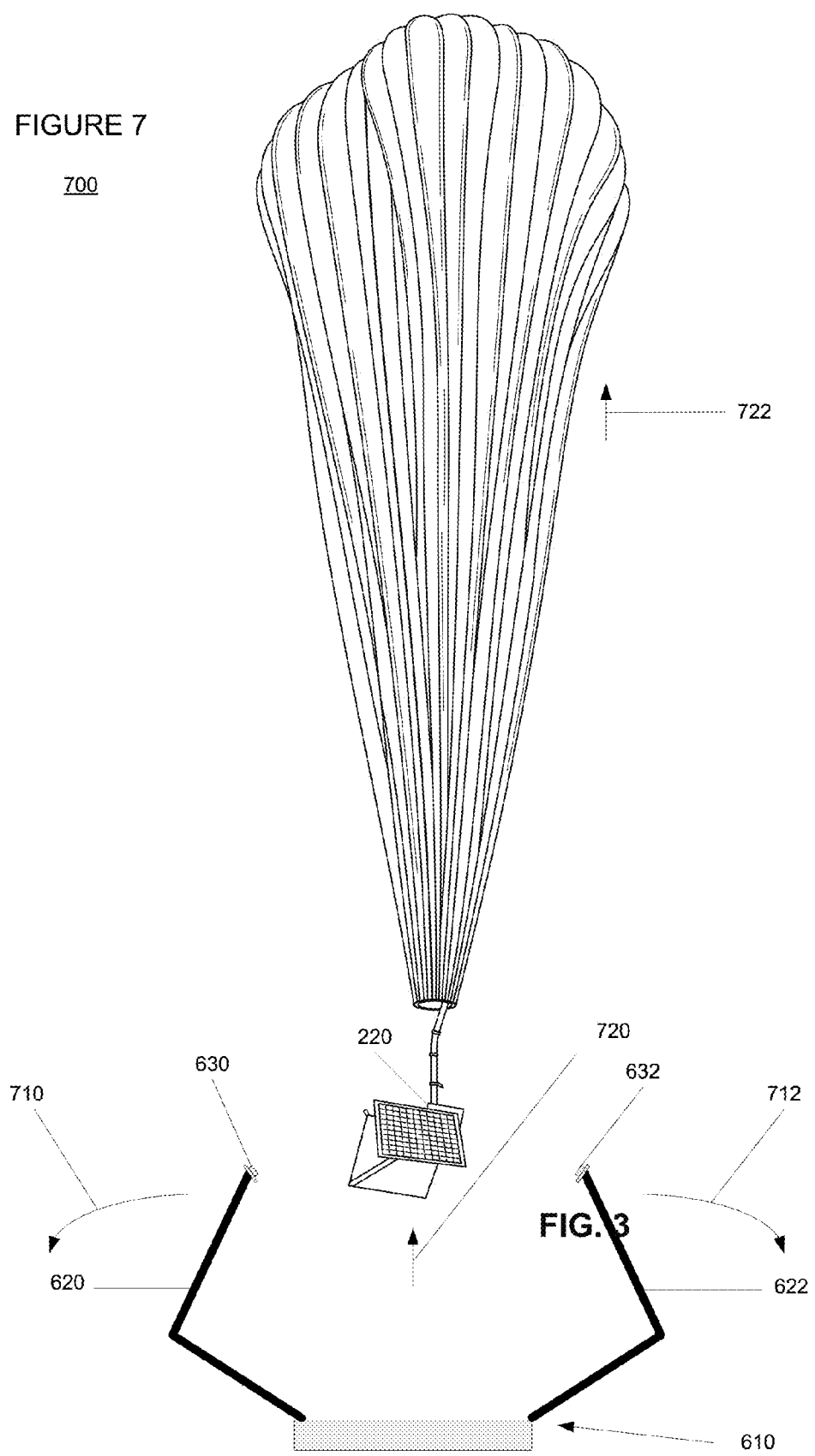

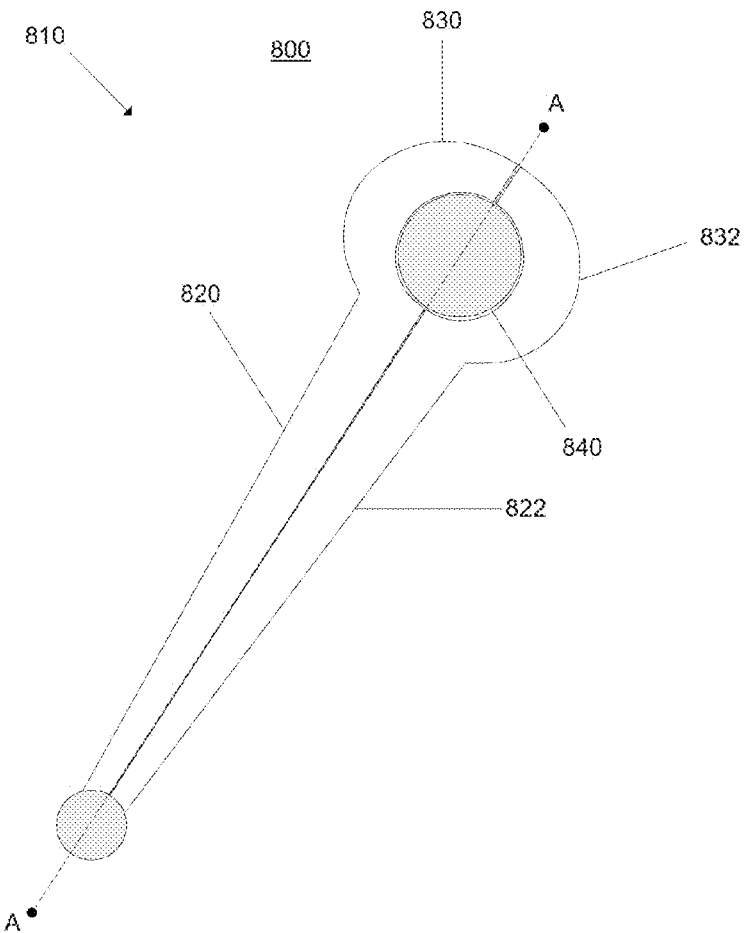
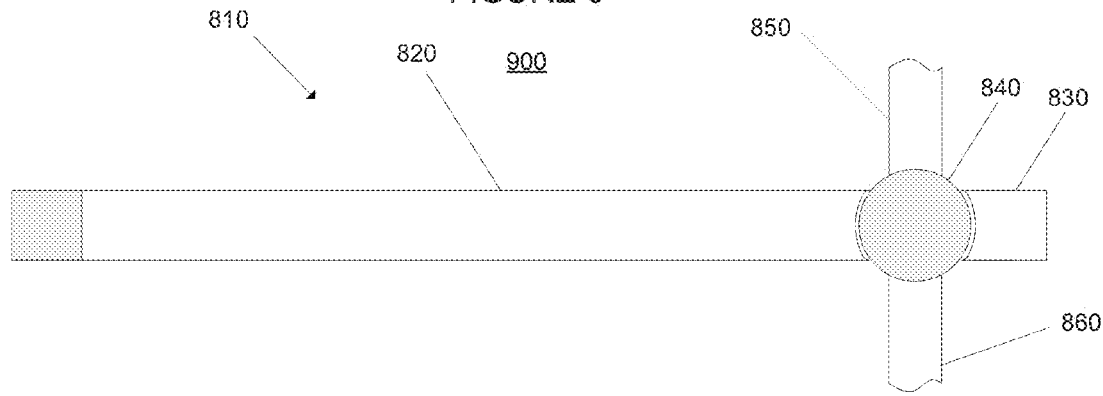

1000

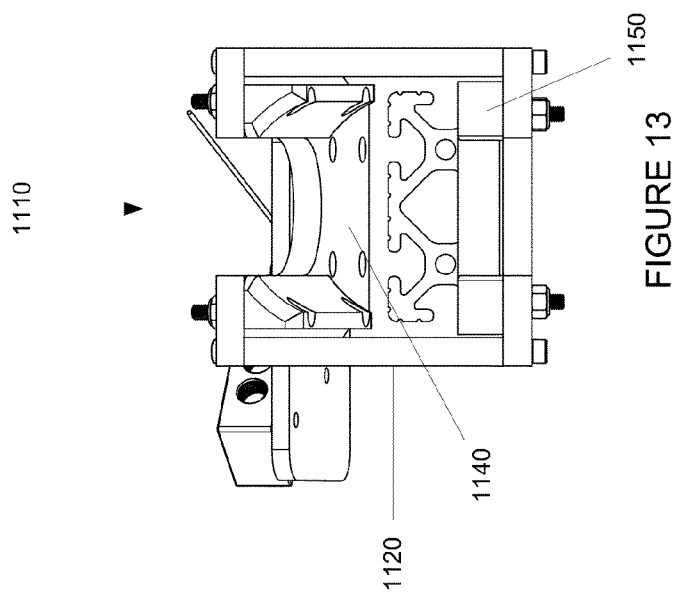
FIGURE 13
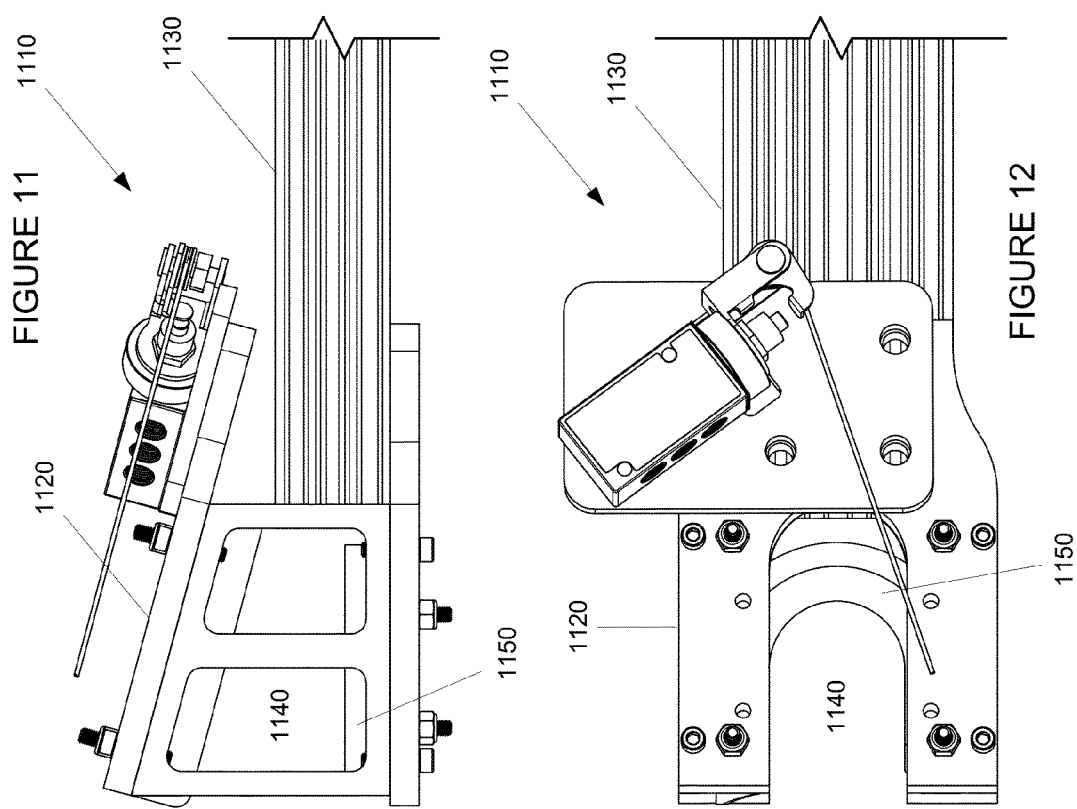
FIGURE 11
FIGURE 12

BALLOON LAUNCHING APPARATUSES

CROSS-REFERENCE TO RELATED APPLICATIONS

The present application is a continuation of U.S. patent application Ser. No. 14/838,498, filed Aug. 28, 2015, which claims the benefit of the filing date of U.S. Provisional Patent Application No. 62/182,112 filed Jun. 19, 2015, the disclosure of which is hereby incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

Before a balloon can be deployed, the balloon envelope must be inflated with lighter than air lift gases, such as helium, hydrogen or other types of gases. However, during inflation of the envelope, various environmental forces can cause damage to components of the balloon before it is deployed. Furthermore, as the balloon transitions to flight, these various forces can also possibly produce unpredictable results in the flight path of the balloon.

BRIEF SUMMARY

Aspects of the present disclosure are advantageous for launching high-altitude balloons. In one aspect, a balloon launching system is provided. The balloon includes a balloon envelope, a payload attached to the balloon envelope, and a launching projection. The system includes a releasable restraint attached to the balloon between an apex and bottom of the balloon envelope. The releasable restraint is arranged to temporarily hold the balloon envelope. The system also includes a payload positioning assembly configured to position the payload during launch of the balloon. The payload positioning assembly including a member configured to attach to the launching projection and maintain the position of the payload relative to the balloon while the releasable restraint is temporarily holding the balloon envelope.

In one example, the system also includes the balloon, and the launching projection is a projection in a cable that connects the balloon envelope to the payload. In another example, the system also includes the balloon, and the launching projection is a portion of a plate located at the base of the balloon envelope. The plate has one or more tendons which extend along a portion of the balloon envelope in order to provide support to the balloon envelope when inflated. In another example, the system also includes the balloon and the launching projection is a portion of the payload. In another example, the payload positioning assembly includes a first arm attached to the member, and the first arm is configured to move away from the launching projection when the launching projection is released from the member. In another example, the payload positioning assembly includes a second arm attached to the member. The second arm and first arm are configured to attach to the member by a clamping force. The second arm is configured to move away from the launching projection and the first arm when the launching projection is released from the member. In another example, the member is configured to release the launching projection when the balloon envelope causes a certain amount of force on the member.

In another example, the member includes a switch. This switch is configured to release the launching projection from the member when the balloon envelope causes a certain amount of force on the switch and activates the switch. In this example, the payload positioning assembly includes a first arm attached to the member, and the switch is configured to move the first arm away from the launching projection when the balloon envelope activates the switch.

In another example, the member is configured to release the launching projection after the releasable restraint is released from holding the balloon envelope and the released balloon envelope pulls the launching projection into a certain angle relative to the member. In this example, the payload positioning assembly includes a first arm attached to the member, and the first arm is configured to move away from the launching projection when the launching projection is released from the member. In another example, the member includes a switch. This switch is configured to release the launching projection from the member when the launching projection activates the switch. In this example, the payload positioning assembly includes a first arm attached to the member, and the switch is configured to move the first arm away from the launching projection when the launching projection activates the switch.

In another example, the launching projection forms at least a portion of a sphere. In another example, the member is configured with an opening for receiving the launching projection and a seat for holding the launching projection. The seat is configured to allow the launching projection to rotate relative the seat and move through the opening and away from the member after the releasable restraint is released from holding the balloon envelope. In this example, the payload positioning assembly includes a first arm attached to the member, and the first arm is configured to move away from the launching projection when the launching projection moves through the opening. In another example, the system also includes the balloon.

Another aspect of the disclosure provides a method of launching a balloon having a balloon envelope, a payload attached to the balloon envelope, and a launching projection. The method includes attaching a payload positioning assembly to the launching projection in order to maintain the position of the payload relative to the balloon while a releasable restraint is temporarily holding the balloon envelope. The releasable restraint is attached to the balloon between an apex and bottom of the balloon envelope. The releasable restraint is also arranged to temporarily hold the balloon envelope during inflation of the balloon envelope. The method also includes inflating the balloon envelope with lift gas, releasing the releasable restraint from the balloon envelope, and after releasing the releasable restraint, launching the balloon by releasing the payload positioning assembly from the launching projection.

In one example, the payload positioning assembly is released when the inflated balloon envelope causes a certain amount of force on the payload positioning assembly. In another example, the payload positioning assembly further includes at least one arm, and the method also includes when the payload positioning assembly is released from the launching projection, moving the arm away from the payload and the balloon envelope.

BRIEF DESCRIPTION OF THE DRAWINGS

FIGS. 6 and 7 are an example of a payload positioning assembly and a balloon in accordance with aspects of the present disclosure.

FIGS. 8-10 are views of an example payload positioning assembly and portions of a balloon in accordance with aspects of the present disclosure.

FIGS. 11-13 are views of a further example payload positioning assembly in accordance with aspects of the present disclosure.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
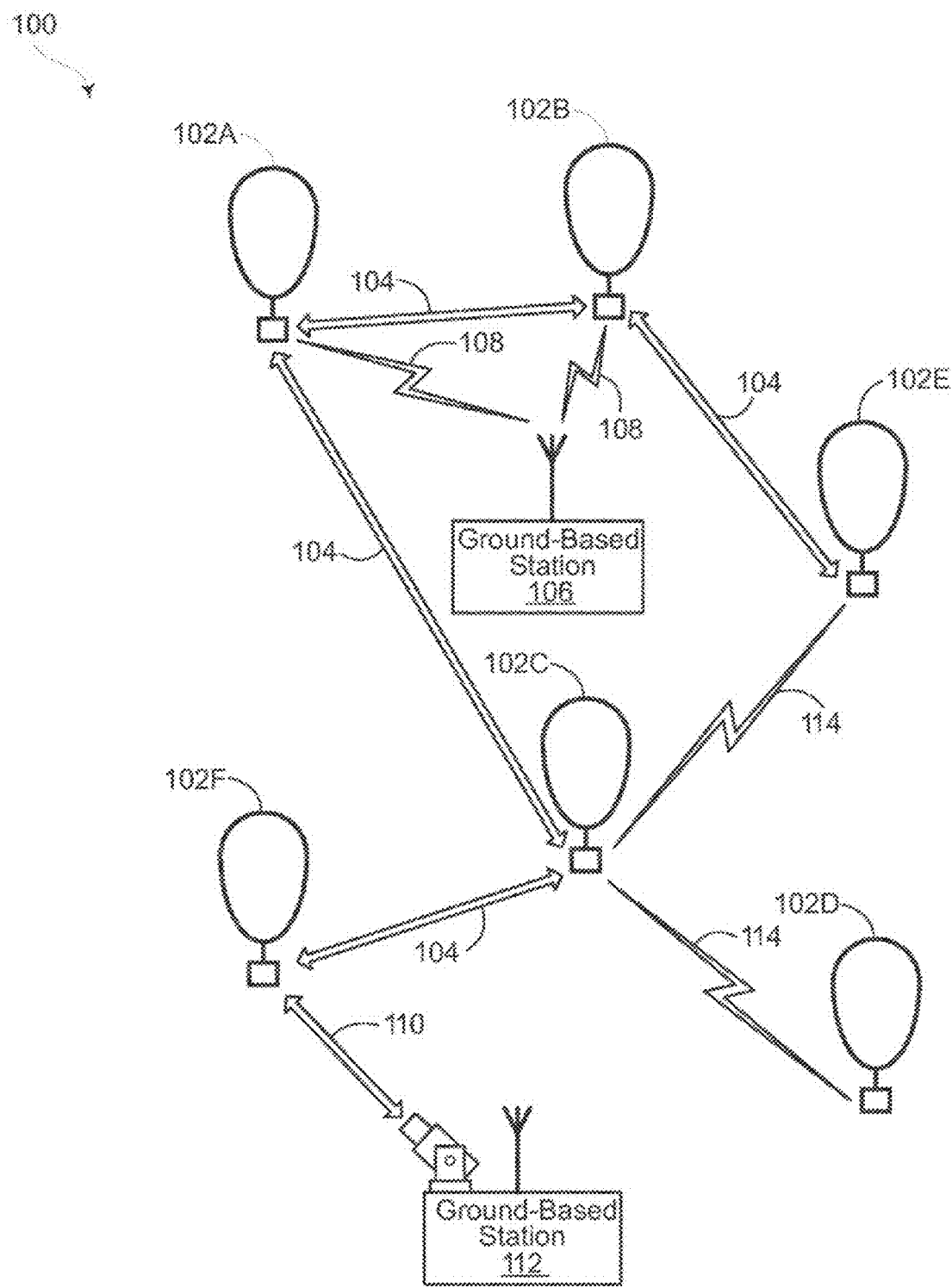
FIG. 1 is a functional diagram of a system in accordance with aspects of the present disclosure.

The present disclosure generally relates to providing techniques for launching high-altitude balloons such as those used in communication networks shown in FIG. 1. In some situations, these communication networks may include hundreds or thousands of balloons that are deployed in the stratosphere at the same time. Each balloon may carry a payload which may include various components such as electrical equipment necessary for such networks to operate. During launch, these payload components may be pulled into the air by a rising balloon. When the payload initially "takes flight," there is some danger of the payload colliding with launch equipment and causing damage to the payload component as well as the launch equipment. Aspects of the features described below, may provide a launch assembly that automatically positions the payload during launch. By doing so, this may significantly reduce the likelihood of damage to the payload and launch equipment.

In a typical launch situation, an envelope portion of a balloon is secured to a releasable restraint attached to the balloon between an apex and bottom of the balloon envelope. The releasable restraint is arranged to temporarily hold the balloon envelope. For example, the restraint may be configured to have a sufficient weight to keep the balloon in place while it is being prepared for deployment. To deploy the balloon, the balloon envelope must be filled with lift gas. When the balloon envelope has been inflated with the lift gas to a predetermined size, the releasable restraint may be released in order to launch the balloon.

In order to protect the payload when a balloon is launched, a payload positioning assembly may be used. The assembly may position or maintain the position of the payload until the releasable restraint has been released and the balloon envelope has reached a certain height or location relative to the payload where the payload is ready to be released. In one example, the payload positioning assembly may be configured attach onto a projection located between the balloon envelope and the payload.

In one embodiment, the assembly includes two arms having end portions which are configured to clamp onto the bottom plate. As the balloon rises, the arms may be configured to automatically or passively release the base plate. For example, when the upward force on the clamp mechanism from the balloon reaches a certain amount, the assembly may be configured to release the base plate. In another example, an operator may manually activate a switch to release the clamp mechanism when the balloon envelope is in a desired position relative to the clamp mechanism. Once released, the end portions of the two arms may be configured to fall away from the balloon and payload. Thus, the arms would not interfere with the rising payload during launch.

Again, rather than clamping onto the base plate, the end portions may be configured to clamp onto another type projection. The projection may be a part of the payload or a projection on a cable or other structure connecting the base plate to the payload. As with the above example, once the balloon envelope is in a desired position, the clamp mechanism may be configured to automatically or manually release the projection and fall away from the balloon and payload.

In another alternative, the arms of the clamp may be joined at one end. The end portions of the arms may be configured to clamp onto the base plate or other projection. Again, the projection may be released when a certain amount of pulling force from the balloon on the projection is reached. At this point, the projection may force open the end portions of the clamp and release the projection. Alternatively, the certain amount of pulling force may activate a switch at one or both of the end portions which releases the projection. In yet another alternative, a switch may be activated remotely by an operator when the balloon is in the desired position.

In another embodiment, rather than a clamp having movable arms, a launch assembly having a fixed claw may be used. In this example, the claw may include an opening for receiving a projection. Again, the projection may be a part of the payload, a projection on the structure connecting the base plate to the payload, or incorporated into the base plate. Once placed in the opening, the projection may sit in an open u-shaped base. During launch, the projection may be configured to slide and/or rotate along the u-shaped base until the projection has reached a predetermined angle relative to the claw and a certain amount of pulling force from the balloon on the projection. At this point, the projection may slide out of the u-shaped base and the claw, thereby releasing the projection. This allows for the payload to remain in a given position until the payload can be launched in a specific direction, thereby preventing the balloon from pulling the payload back into the launch assembly.

In some examples, once the projection is released from the claw, the launch assembly can be configured to retract, swing, lower, or otherwise fall away from the balloon and the payload. This may further reduce the likelihood of damage to the payload. The trigger for causing the assembly to fall away may include a pressure sensitive switch on the u-shaped base which is activated by the projection when it reaches a predetermined angle as the projection rotates along the u-shaped base. In another example, the trigger may include a pressure sensitive switch on the claw that is activated when there is a predetermined force of pulling force on the claw by the balloon. Alternatively, a switch may be activated manually by an operator which causes the launch assembly to fall away at the desired time.

The features described herein may provide for a high degree of control of the positioning and release of a payload while on the ground and during the critical moments of launch. Such features can support both vertical and horizontal payload loading conditions. By utilizing minimal or no electronic parts, the launch assemblies described herein may be both cost effective and reusable. In addition, at least some of the examples provide for retraction of the launch apparatus in order to reduce the likelihood of damage to the payload and payload components during launch.

Example System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
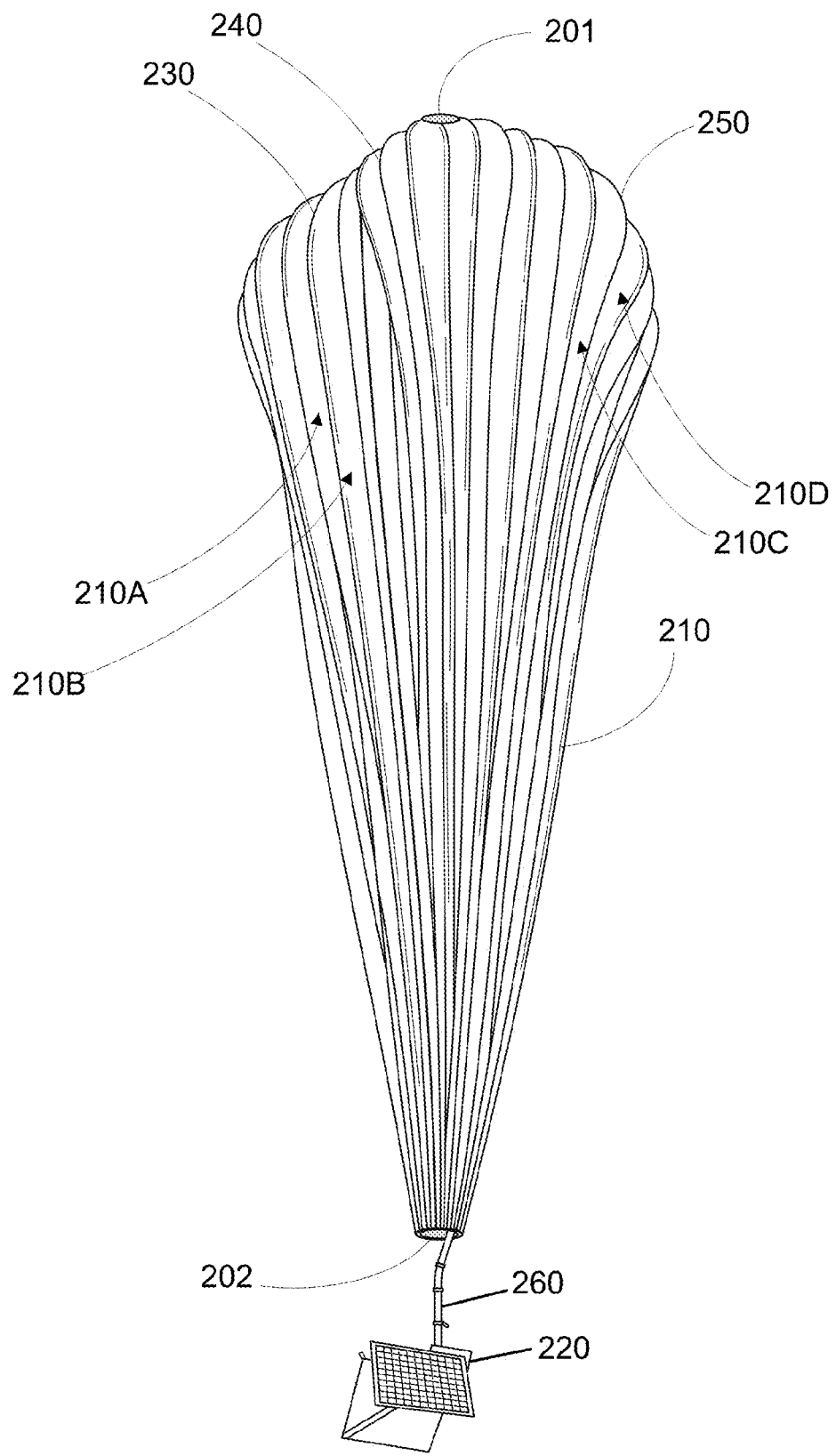
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of balloon envelope 210. Bottom ends of the tendons 230, 240 and 250 may also be connected to one another. For example, a corresponding apparatus, e.g., base plate 202, may be disposed at a base or bottom of the balloon envelope 210. The top plate 201 at the apex may be the same size and shape as and base plate 202 at the bottom of the balloon envelope. Both plates may include corresponding components for attaching the tendons 230, 240 and 250 to the balloon envelope 210.

Example Assembly

Figure 3:
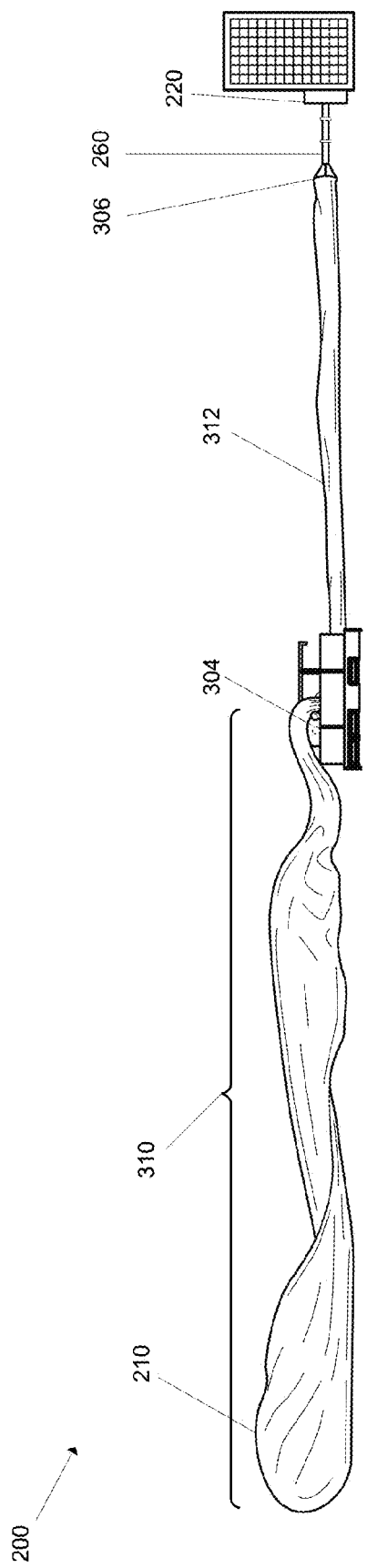
FIG. 3 is an example of a balloon and releasable restraint in accordance with aspects of the present disclosure.

As noted above, one aspect of the present technology provides an automated assembly for launching high-altitude balloons, such as balloon 200 from FIG. 2. FIG. 3 is an example of an assembly 300. Here, a perspective view of the assembly 300 is shown. In this example, the assembly 300 includes a releasable restraint 304 attached to the balloon 200 between an apex and bottom of balloon envelope 210. The releasable restraint 304 is arranged to temporarily hold the balloon envelope, for example, on to an upper surface of a platform until the balloon 200 is ready for deployment.

Releasable restraint 304 is configured to temporarily hold the balloon envelope 210 in place while the balloon 200 is being prepared for launch. For example, as shown in example 300 of FIG. 3, the releasable restraint 304 may be attached to the balloon 200 between an apex and bottom of the balloon envelope 210 effectively sectioning the envelope into upper and lower portions 310 and 312. The releasable restraint 304 may be configured to limit an amount of movement of the balloon envelope 210 and thereby prevent the envelope from being damaged by oncoming winds before it is able to take flight. In this regard, the releasable restraint 304 may be of a sufficient weight to limit movement of the balloon envelope 210 in certain directions. This releasable restraint 304 may be attached to a device, such as a draw string or other types of similar devices, which can be manually and/or automatically retracted in order to detach the releasable restraint 304 from the balloon 200.

To prepare the balloon 200 for flight, the balloon envelope 210 is inflated with lift gas. For example, a fill tube (not shown) attached to the balloon envelope 210 can be coupled to a lift gas fill source (not shown), which can be used to inflate the balloon 200. As the balloon envelope 210 is inflated, the upper portion 310 of the envelope may reach a predetermined size that may cause this upper portion 310 to rise upward. Thereupon, the releasable restraint 304 may be configured to release the balloon components so that the balloon 200 can move further into the air.

In order to protect the payload while the balloon is being inflated and rising into the air, a payload positioning assembly may be used. As noted above, the payload positioning assembly may position or maintain the position of the payload until the releasable restraint has been released and the balloon envelope has reached a certain height or location relative to the payload. At this certain height, the payload may be ready to be released by the payload positioning assembly.

Figure 4:
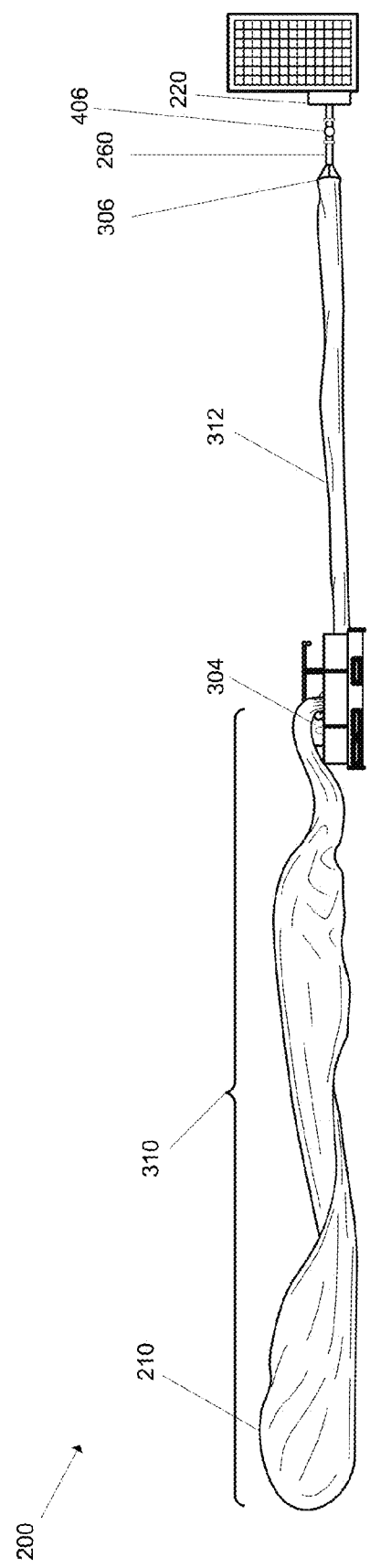
FIG. 4 is another example of a balloon and releasable restraint in accordance with aspects of the present disclosure.

In one example, the payload positioning assembly may be configured attach onto a projection of the balloon. This projection may be positioned on some portion of the balloon 200, for example, between the balloon envelope 210 and the payload 220. For instance, a projection 306 may include, be incorporated into, or be attached to the base plate 202 as shown in FIG. 3. In another example, a projection 406 may be incorporated into the incorporated onto the connection 260 such that the projection is located between the payload 220 and the lower portion 312 of the envelope 210 as shown in example 400 of FIG. 4. In a further example, a projection 506 may be incorporated into the payload 220 as shown in example 500 of FIG. 5. Any of these projections 306, 406, and 506 may be formed into a certain shape, such as a sphere or other projection to which the payload positioning assembly can attach.

Figure 6:
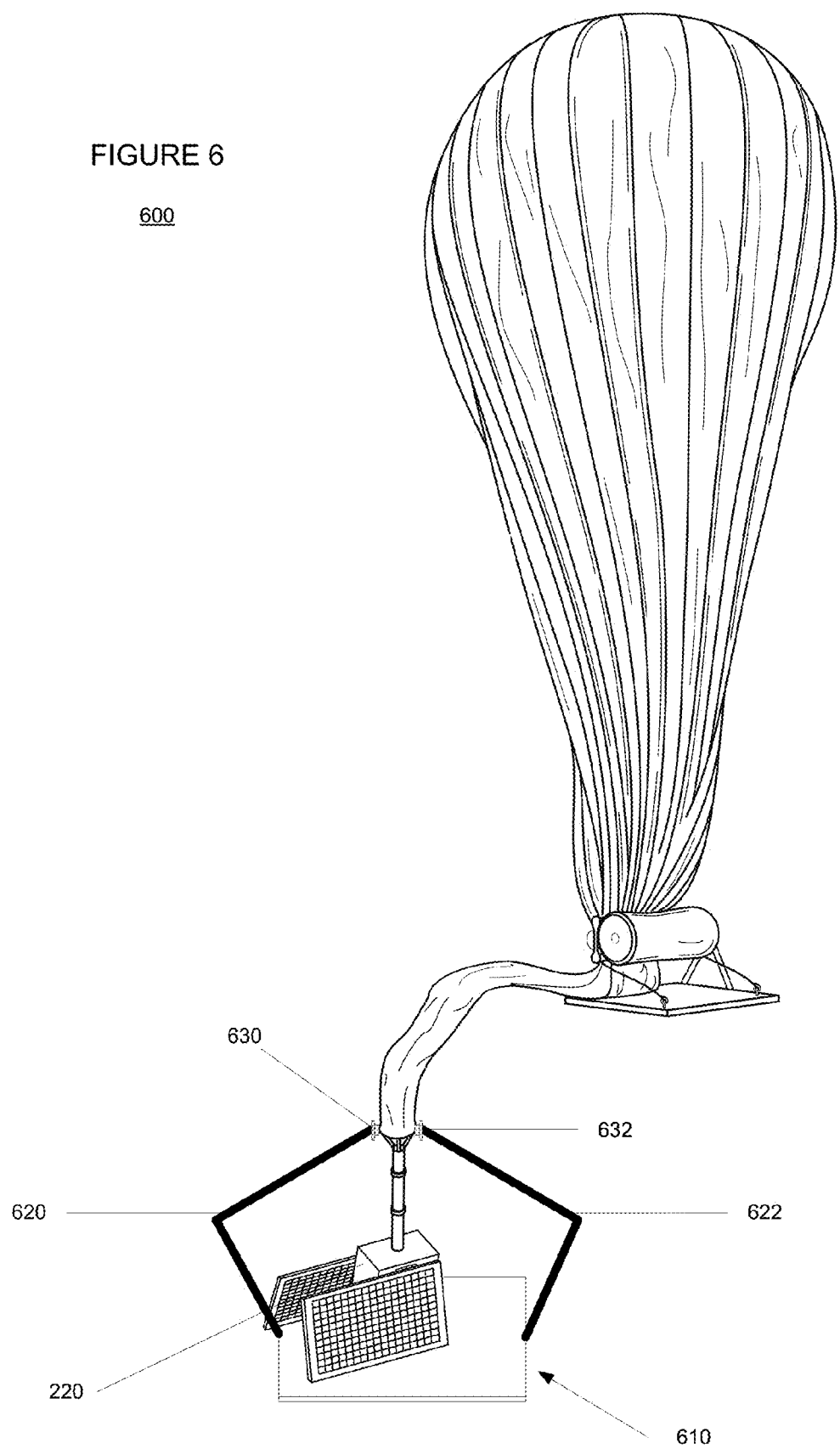

FIG. 6 an example 600 of a payload positioning assembly 610 and balloon 200. In this example, the assembly 610 includes two arms 620, 622 having end portions 630, 632 which are configured to clamp onto the base plate 202.

In the example 600 of FIG. 6, balloon 200 is shown as partially inflated, thus, balloon envelope 210 is in the process of rising upwardly. At a certain point, such as when the releasable restraint has been released and the balloon is fully inflated and free to move away, the arms 620, 622 may be configured to automatically or passively release the base plate 202. For example, when the upward force on the clamp mechanism from the rising balloon reaches a certain amount, the clamping force of the arms on the base plate 202 may be overcome. At this point, the assembly 610 may be configured to release the base plate or rather, the end portions 630, 632 of the arms 620, 622 may release the base plate 202.

Alternatively, the assembly 610 may include a switch that is activated when the upward force on the clamp mechanism from the rising balloon reaches a certain amount. In this case, rather than "breaking" the clamping force of the end portions 630, 632, the certain amount of force may simply activate the switch which, in turn, releases the end portions 630, 632 from the base plate 202.

In yet another example, rather than an automatic release of the base plate 202, an operator may manually activate a switch to release the clamp mechanism. For example, when the balloon envelope is in a desired position relative to the clamp mechanism, an operator may simply activate the switch to cause the assembly 610 to release the base plate 202.

Once released, either automatically or manually as described above, the end portions 630, 632 may be configured to fall away from the balloon and payload. For example, as shown in FIG. 7, once the end portions 630, 632 release the base plate 202, the arms 620, 622 fall away from the base plate 202. In this example, the arms 620 and 622 rotate around an axis in the direction of arrows 710 and 712, respectively. away from the base plate 202, thereby falling away from the balloon envelope, the connection 206 and the payload 220. Because of this falling away action, the arms 620, 622 and end portions 630, 632 would not interfere with the payload as it begins to rise in the direction of arrows 720 and 722 with the balloon 200.

Figure 5:
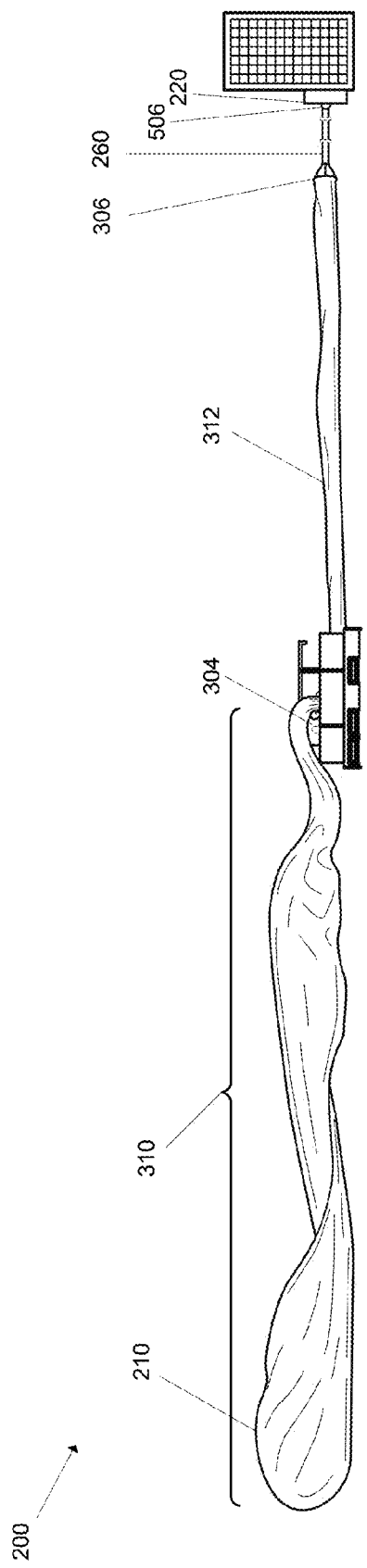
FIG. 5 is a further example of a balloon and releasable restraint in accordance with aspects of the present disclosure.

Again, rather than clamping onto the base plate, the end portions 630, 632 may be configured to clamp onto another type projection. For example, the end portions 630, 632 may be configured to clamp onto projection 406 of the connection 206 (FIG. 4) or the projection 506 of the payload 220 (FIG. 5). As with the above example, once the balloon envelope is in a desired position, the clamp mechanism may be configured to automatically or manually release either projection 406 or 506 and fall away from the balloon envelope 210, connection 260, and payload 220.

In another alternative, the arms of the clamp may be joined at one end. For example, FIG. 8 is an example 800 of a top down view of a payload positioning assembly 810, and FIG. 9 is an example 900 of a cross-sectional side view of the assembly 810 through line A-A of FIG. 8. As with assembly 610, assembly 810 includes two arms 820, 822 having end portions 830, 830 configured to clamp onto a projection 840. In this example, the projection 840 may include projection 306, projection 406, or projection 506. In addition, as noted above, projection 840 may be a spherical projection. Depending on the location of the projection 840 relative to the balloon, feature 850 may include one of the balloon envelope 210 (or lower portion 312) or the connection 260, while the feature 860 may include one of the connection 260 or the payload 220.

As with assembly 610, assembly 810 may be configured to release the projection 810 when a certain amount of pulling force from the balloon. This pulling force may cause the projection to force open the end portions of the clamp and release the projection. Alternatively, the certain amount of pulling force may activate a switch at one or both of the end portions which releases the projection. In yet another alternative, a switch may be activated remotely by an operator when the balloon is in the desired position.

Figure 10:
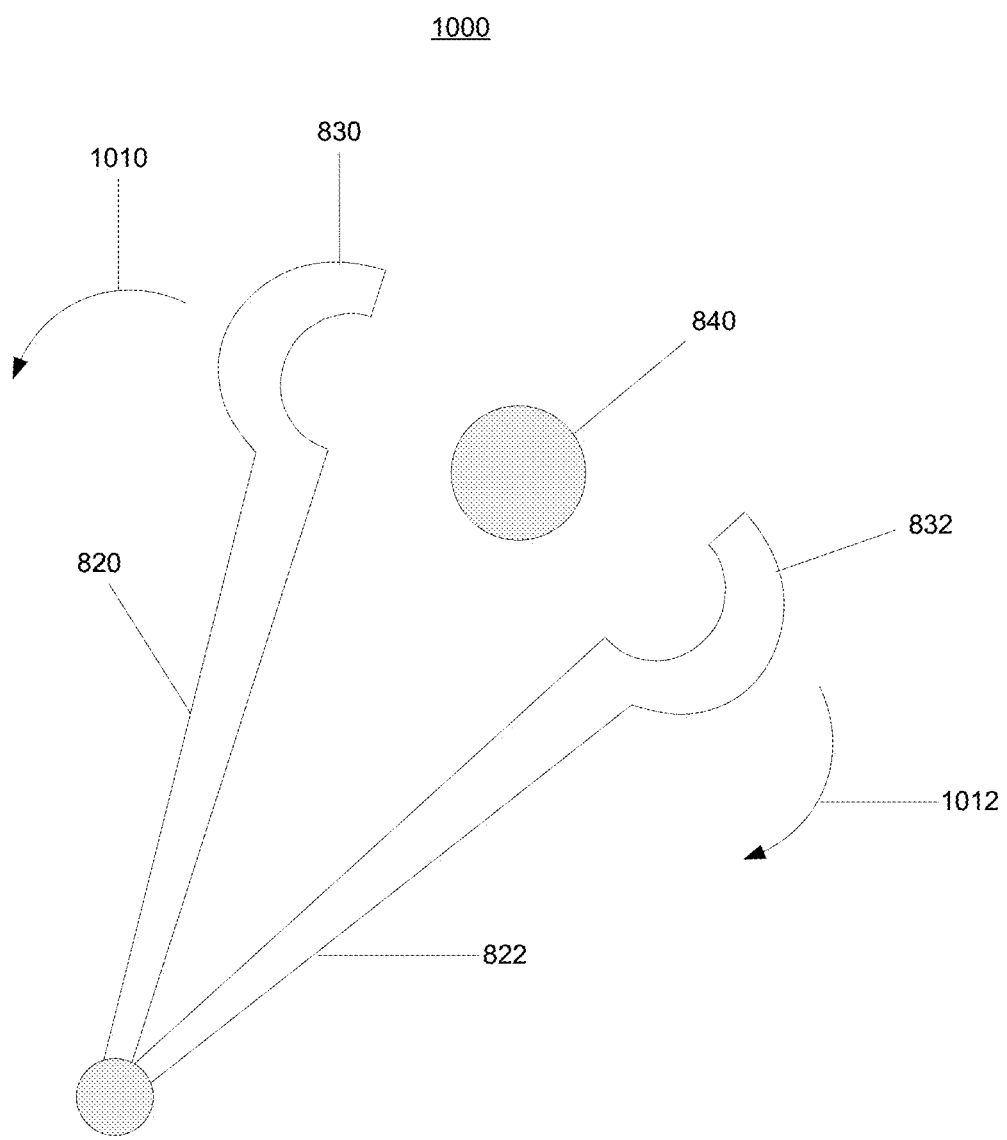

FIG. 10 is an example 1000 of a top down view of assembly 810 when the arms 820, 82.2 have released the projection 840. As with assembly 610, once released, either automatically or manually as described above, the end portions 830, 832 may be configured to fall away from the balloon and payload. In this example, the arms 820 and 8:22 rotate around an axis in the direction of arrows 1010 and 1012, respectively, away from the projection 840. In this regard, the arms 820, 822 and end portions 830, 832 would not interfere with the balloon envelope 210, connection 260, and payload 220 as the balloon begins to rise.

In another embodiment, rather than a clamp having movable arms, a payload launch assembly having a fixed claw may be used. FIGS. 11-13 include examples of a payload launch assembly 1110 having a fixed claw 1120. In other words, the claw itself does not require movable parts. FIG. 11 is a side view of the assembly 1110 depicting the claw 1120 connected to a movable arm 1130. The claw includes an opening 1140 having a u-shaped base 1150 configured to receive and temporarily hold a projection (not shown). FIG. 12 is a top down view of the assembly 1110 and FIG. 13 is another side view of the assembly looking towards the opening 1140.

Figure 15:
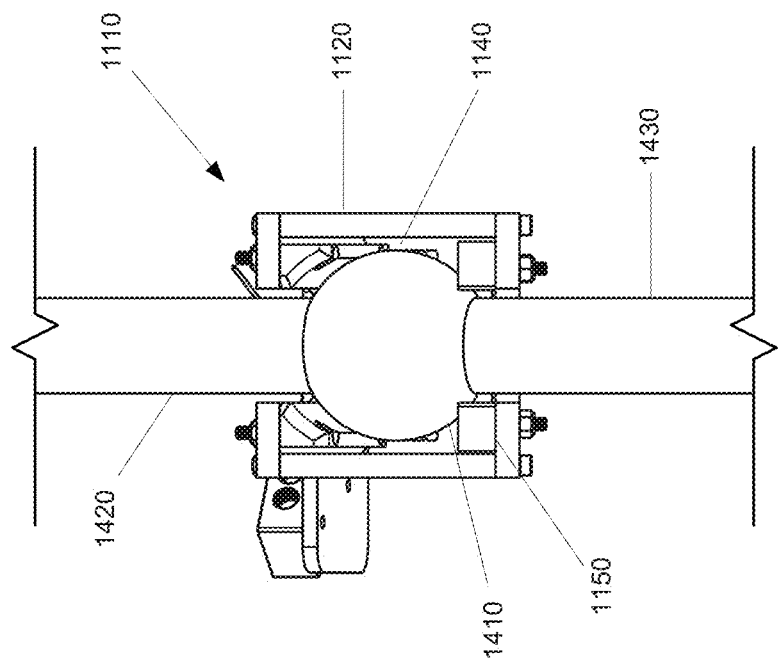
FIGS. 14 and 15 are views of a payload positioning assembly and portions of a balloon in accordance with aspects of the present disclosure.
Figure 14:
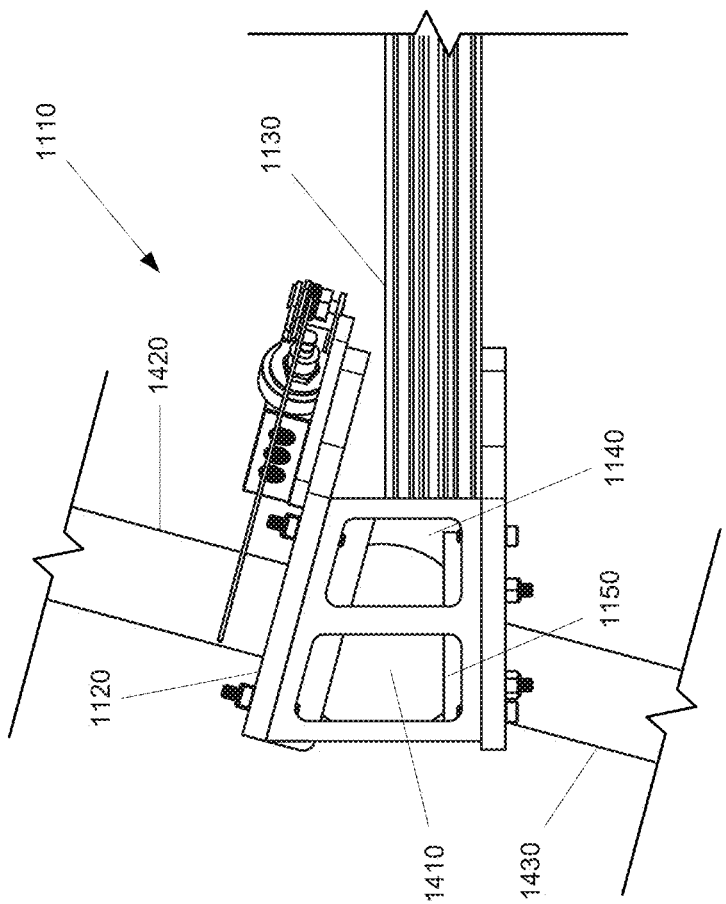

Prior to filling the balloon envelope with lift gas, as shown in FIG. 14 (corresponding to the view of FIG. 11) and FIG. 15 (corresponding to the view of FIG. 13), a projection 1410, which may correspond to any of projection 306, 406, or 506, may be placed in the assembly 1110. In one example, the projection. The projection 1410 may be moved through the opening 1130 and positioned in the u-shaped base 1150. As noted above, the u-shaped base 1150 may be configured to temporarily hold the projection 1410 in the claw 1120 prior to launching the balloon 200. Depending on the location of the projection 1410 relative to the balloon, feature 14:20 may include one of the balloon envelope 210 (or lower portion 312) or the connection 260, while the feature 1430 may include one of the connection 260 or the payload 220.

Figure 16:
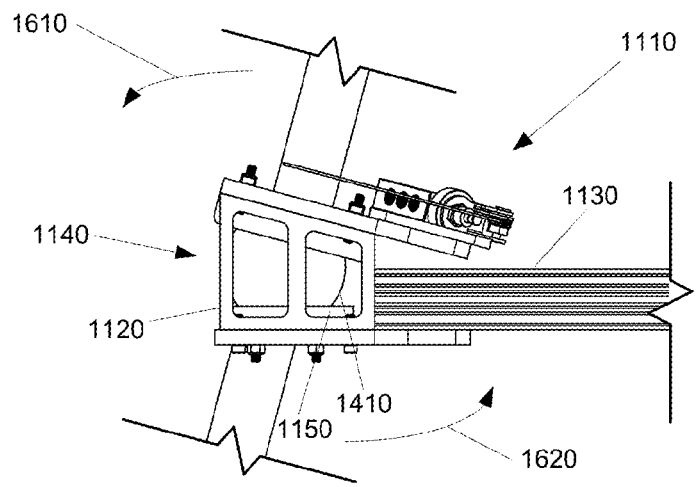
FIGS. 16-18 are an example of a portion of a balloon being released from a payload positioning assembly in accordance with aspects of the present disclosure.
Figure 17:
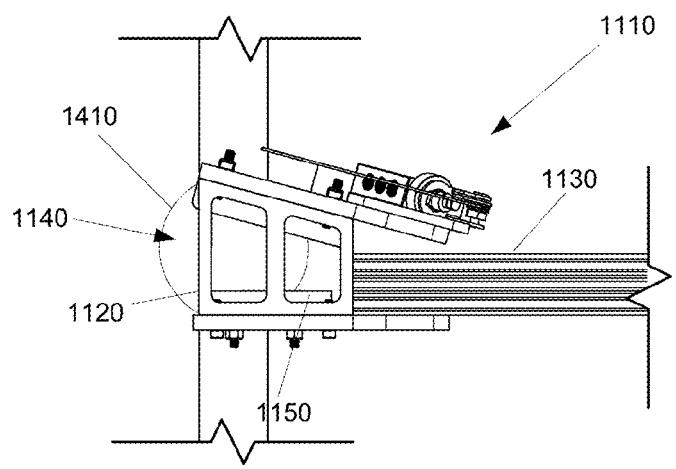
Figure 18:
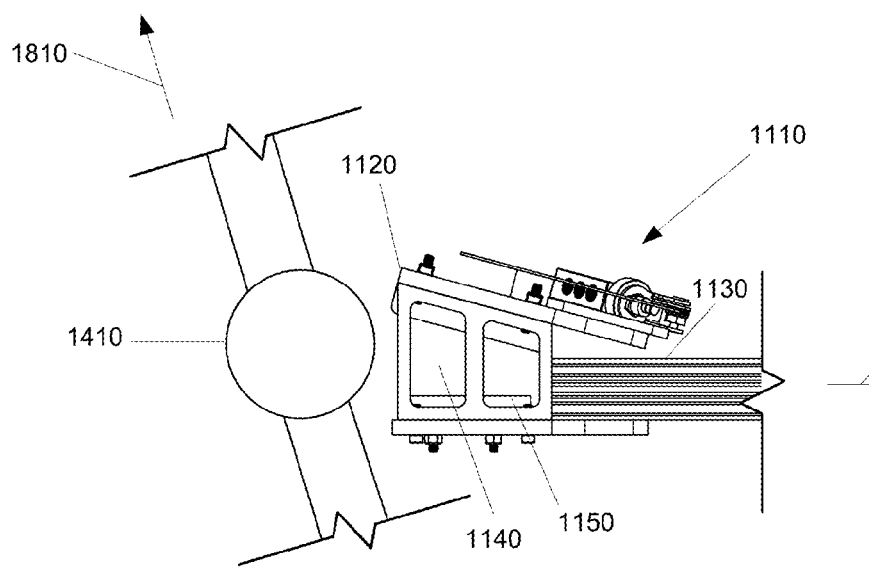

When the balloon is launched, the claw 1120 may be configured to release the projection 1410. FIGS. 16-18 are an example of a release of the projection 1410 form the claw 1120. In this example, once the balloon envelope 210 is fully inflated and the releasable restraint 304 is released, the balloon envelope may begin to rise. The movement of the balloon envelope 210 may pull the projection in an upward and outward direction. In other words, the projection may begin to rotate in the direction of arrows 1610, 1620 relative to the claw 1120. As this occurs, the projection 1410 may slide and/or rotate along the u-shaped base 1150 until the projection has reached a predetermined angle relative to the claw and a certain amount of pulling force from the balloon on the projection as shown in FIG. 17. At this point, the projection may move through the opening 1140, thereby releasing the projection from the claw 1120 as shown in FIG. 18. The projection 1410 and balloon 200 are then free to continue to rise in the direction of arrow 1810 as the balloon is launched. Thus, the assembly 1110 allows for the payload to remain in a given position until the payload can be launched in a specific direction (defined by the predetermined angle), thereby preventing the balloon from pulling the payload back into the launch assembly.

In some examples, once the projection is released from the claw, the assembly 1110 can be configured to retract, swing, lower, or otherwise fall away from the balloon and the payload. For example, arm 1130 may be configured to move away from the projection in the direction of arrow 1820 in order to further reduce the likelihood of damage to the payload. This movement may be activated automatically by the projection 1410 activating a pressure sensitive switch (not shown) on the u-shaped base 1150 when the projection reaches a predetermined angle relative to the opening 1140 or the u-shaped base 1150. As an example, this predetermined angle may range from zero to positive 25 degrees relative to vertical. In this regard, by adjusting the angle of the claw relative to the ground, the predetermined angle may also be adjusted. In another example, the trigger may include a pressure sensitive switch on the claw 1120 (not shown) that is activated when there is a predetermined force of pulling force on the claw by the balloon. As an example, this force may be in on the order of several hundred pounds. Alternatively, a switch may be activated manually by an operator which causes the launch assembly to fall away at the desired time.

Figure 19:
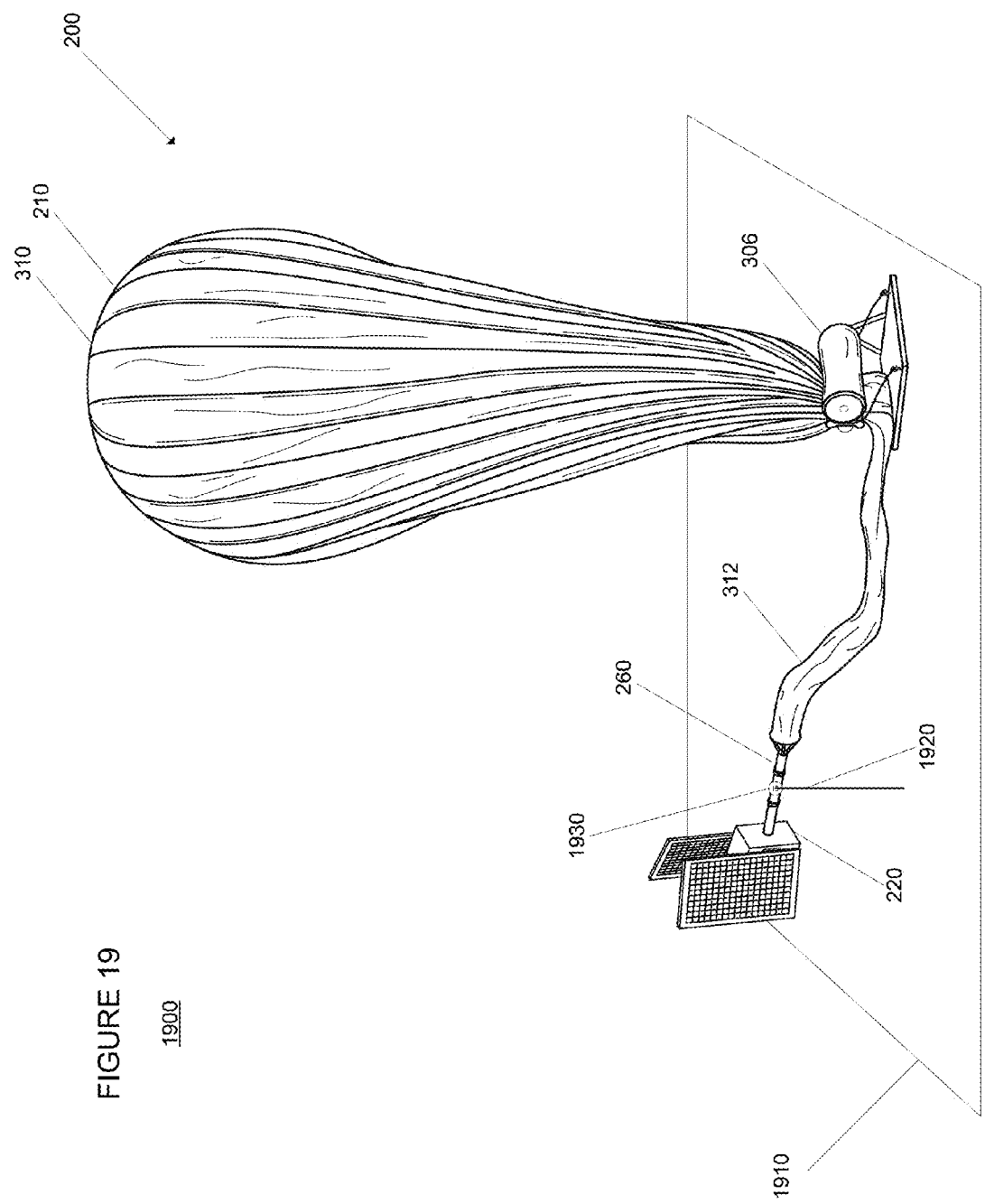
FIG. 19 is an example of a horizontal payload loading condition in accordance with aspects of the present disclosure.

The assemblies discussed above can support both vertical and horizontal payload loading conditions. FIG. 19 is an example 1900 of a horizontal payload loading condition. In this example, both the balloon envelope 210 and the payload 220 of balloon 200 are positioned on a platform 1910. In this example, an assembly 1920 is attached to a projection 1930 that is located on the connection 260. Assembly 1920 may correspond to any one of assemblies 610, 810, or 1110.

Figure 20:
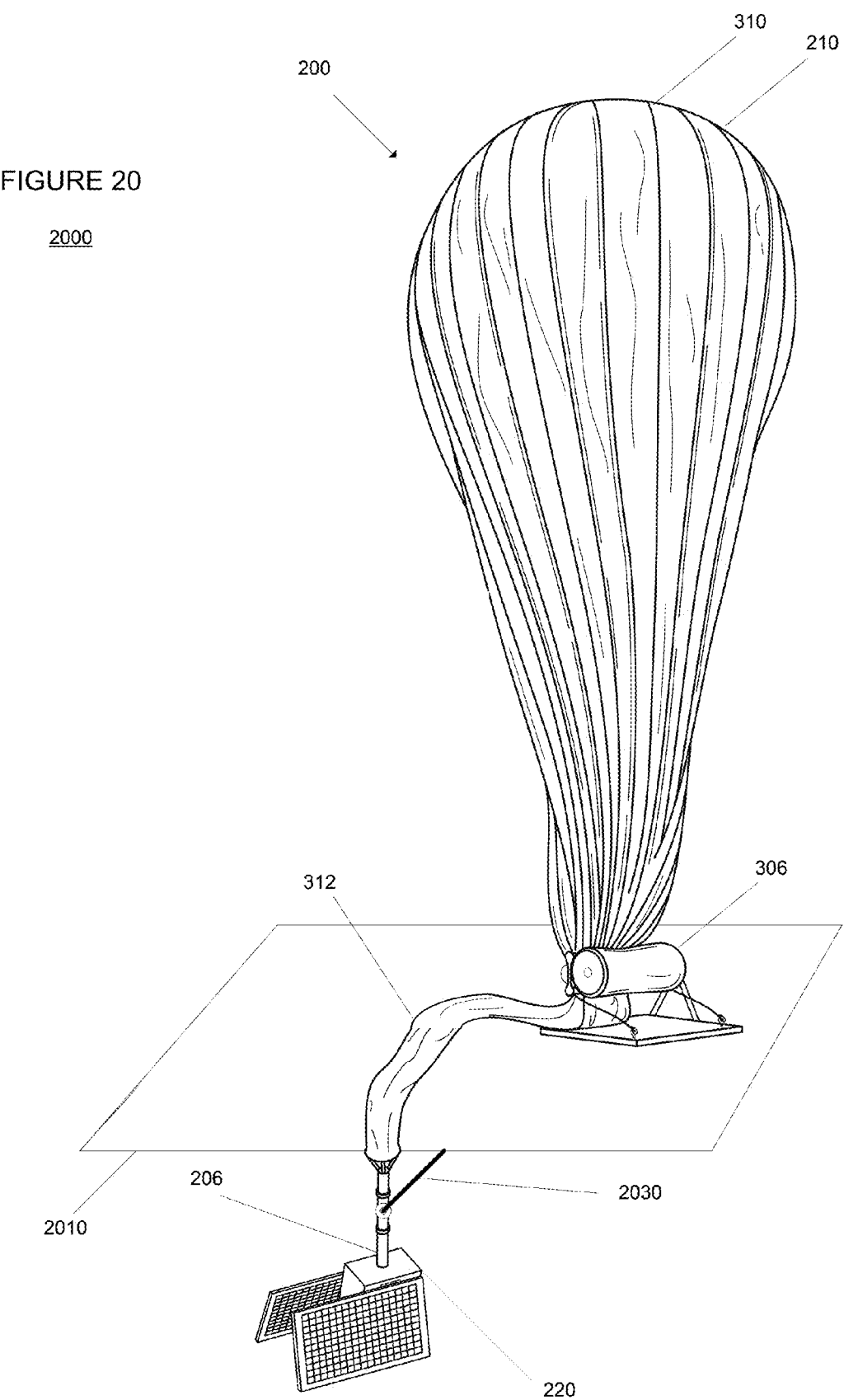
FIG. 20 is an example of a vertical payload loading condition in accordance with aspects of the present disclosure.

FIG. 20 is an example 2000 of a vertical payload loading condition. In this example, the balloon envelope 210 is positioned on a platform 2010, while the payload 220 is positioned below the platform 2010. In this example, an assembly 2020 is attached to a projection 2030 that is located on the connection 260. A similar payload loading condition may also be achieved if the assembly 2020 were attached to a projection that was located on the payload 220. In addition, in the example 2000 1920 may correspond to any one of assemblies 610, 810, or 1110.

Example Flow Diagram

Figure 21:
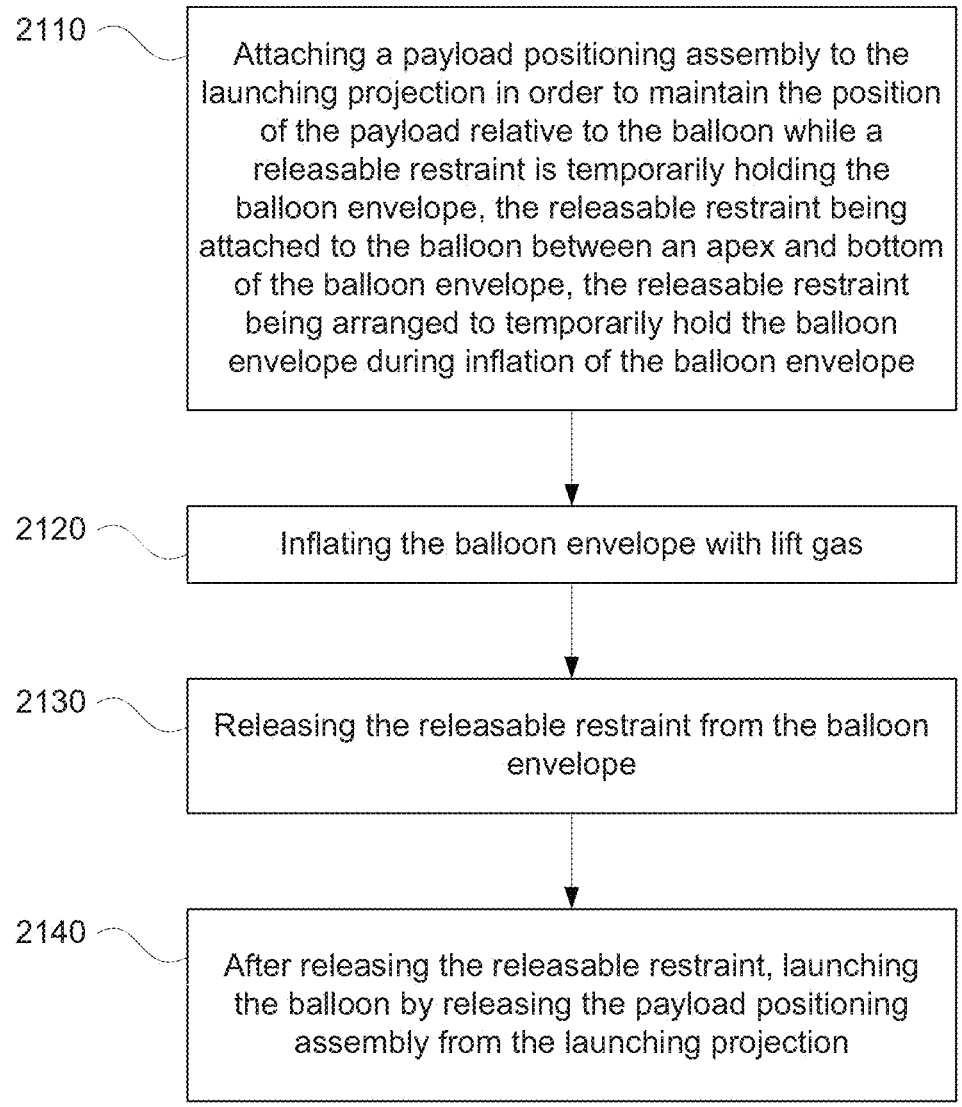
FIG. 21 is a flow diagram depicting an example of a method in accordance with aspects of the present disclosure.

To better aid in understanding an example of some of the aspects described above, reference is now made to FIG. 21, which illustrates a flow diagram 2100 depicting a method of launching a balloon having a balloon envelope, a payload attached to the balloon envelope, and a launching projection. As previously discussed, the following operations do not have to be performed in the precise order described below. Rather, as mentioned above, various operations can be handled in a different order or simultaneously, and operations may be added or omitted.

At block 2110, a payload positioning assembly to a launching projection in order to maintain the position of the payload relative to the balloon while a releasable restraint is temporarily holding the balloon envelope. The releasable restraint is attached to the balloon between an apex and bottom of the balloon envelope. The releasable restraint is arranged to temporarily hold the balloon envelope during inflation of the balloon envelope. The balloon envelope is then inflated with lift gas at block 2120. The releasable restraint is released from the balloon envelope at block 2130. After releasing the releasable restraint, the balloon is launched by releasing the payload positioning assembly from the launching projection at block 2134. As noted in the various examples above, the payload positioning assembly can be released manually or automatically. In addition, the payload positioning assembly may also include at least one arm, such that when the payload positioning assembly is released from the launching projection, moving the arm away from the payload and the balloon envelope.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for launching a balloon having a balloon envelope, a payload attached to the balloon envelope, and a launching projection arranged below the balloon envelope, the system comprising:
　a releasable restraint attached to the balloon between an apex and bottom of the balloon envelope, the releasable restraint being arranged to temporarily hold the balloon envelope; and
　a payload positioning assembly configured to position the payload during launch of the balloon, the payload positioning assembly including a pair of arms configured to clamp onto the launching projection below the balloon envelope and maintain the position of the payload relative to the balloon while the releasable restraint is temporarily holding the balloon envelope; and
　the launching projection, wherein the launching projection is a portion of a plate configured for placement below the balloon envelope.

2. The system of claim 1, further comprising the balloon, wherein the plate includes one or more tendons which extend along a portion of the balloon envelope in order to provide support to the balloon envelope when inflated.

3. The system of claim 1, wherein the positioning assembly is configured to release the launching projection when the balloon envelope causes a certain amount of upward force on the arms.

4. The system of claim 3, wherein the positioning assembly includes a switch, the switch being configured to release the launching projection from the member when the balloon envelope causes a certain amount of upward force on the switch and activates the switch.

5. The system of claim 1, wherein the launching projection forms at least a portion of a sphere.

6. The system of claim 1, further comprising the balloon.

7. The system of claim 1, wherein a first end of first arm of the pair of arms is joined to a first end of a second arm of the pair of arms.

8. The system of claim 7, wherein the second end of the first arm is configured to clamp onto the launching projection and the second end of the second arm is configured to clamp onto the launching projection.

9. The system of claim 7, wherein the pair of arms are joined such that the pair of arms are arranged to release the launching projection by rotating around an axis where the first arm and second arm are joined.

10. The system of claim 8, wherein the positioning assembly includes a switch configured to be operated by an operator in order to move the second end of the first arm away from the second end of the second arm and release the launching projection.

11. The system of claim 1, wherein the positioning assembly is configured to release the launching projection when the balloon envelope causes a certain amount of upward force on the second end of the first arm and the second end of the second arm.

12. The system of claim 1, wherein the portion is configured to be attached to the plate.

13. The system of claim 1, wherein the portion is incorporated into the plate.

14. A method of launching a balloon having a balloon envelope, a payload attached to the balloon envelope, and a launching projection, the method comprising:
　attaching a payload positioning assembly having a pair of arms to the launching projection such that the arms are attached to the balloon below the balloon envelope in order to maintain the position of the payload relative to the balloon while a releasable restraint is temporarily holding the balloon envelope, the releasable restraint being attached to the balloon between an apex and bottom of the balloon envelope, the releasable restraint being arranged to temporarily hold the balloon envelope during inflation of the balloon envelope, and wherein attaching the payload positioning assembly includes attaching the pair of arms to a portion of a plate located below the balloon envelope;
　inflating the balloon envelope with lift gas;
　releasing the releasable restraint from the balloon envelope; and
　after releasing the releasable restraint, launching the balloon by releasing the payload positioning assembly from the launching projection.

15. The method of claim 14, wherein the payload positioning assembly is released when the inflated balloon envelope causes a certain amount of upward force on the payload positioning assembly.

16. The method of claim 14, wherein the plate includes one or more tendons which extend along a portion of the balloon envelope in order to provide support to the balloon envelope when inflated.

17. The method of claim 14, wherein a first end of first arm of the pair of arms is joined to a first end of a second arm of the pair of arms such that the first arm and second arm are configured to rotate about an axis where the first arm and second arm are joined, and attaching the payload positioning assembly includes attaching the second end of the first arm onto the launching projection and the second end of the second arm onto the launching projection.

18. The method of claim 17, wherein releasing the payload positioning assembly includes rotating the pair of arms are joined around the axis.

19. The method of claim 14, wherein the positioning assembly includes a switch, and wherein releasing the payload positioning assembly includes using the switch to move the second end of the first arm away from the second end of the second arm.

20. The method of claim 14, wherein releasing the payload positioning assembly includes causing a certain amount of upward force on the second end of the first arm and the second end of the second arm.

* * * * *